(12) United States Patent
Chen et al.

(10) Patent No.: US 11,124,670 B2
(45) Date of Patent: Sep. 21, 2021

(54) AQUEOUS POLYMER COMPOSITION

(71) Applicants: Dow Global Technologies LLC, Midland, MI (US); Rohm and Haas Company, Collegeville, PA (US)

(72) Inventors: Chen Chen, Shanghai (CN); Baoqing Zheng, Shanghai (CN); Yawei Xu, Shanghai (CN); Xiaohong Yang, Shanghai (CN); Shaoguang Feng, Shanghai (CN); Yujiang Wang, Shanghai (CN); Brough Richey, Malvern, PA (US); Fengzhe Shi, Shanghai (CN)

(73) Assignees: Dow Global Technologies LLC, Midland (ML); Rohm and Haas Company, Collegeville, PA (US)

( * ) Notice: Subject to any disclaimer, the term of this patent is extended or adjusted under 35 U.S.C. 154(b) by 59 days.

(21) Appl. No.: 16/641,666

(22) PCT Filed: Sep. 25, 2017

(86) PCT No.: PCT/CN2017/103087
§ 371 (c)(1),
(2) Date: Feb. 25, 2020

(87) PCT Pub. No.: WO2019/056334
PCT Pub. Date: Mar. 28, 2019

(65) Prior Publication Data
US 2020/0216707 A1    Jul. 9, 2020

(51) Int. Cl.
*C09D 133/12*    (2006.01)
*C08L 33/12*    (2006.01)

(52) U.S. Cl.
CPC ............ *C09D 133/12* (2013.01); *C08L 33/12* (2013.01); *C08L 2201/50* (2013.01)

(58) Field of Classification Search
CPC .................................................. C08L 2201/50
See application file for complete search history.

(56) References Cited

U.S. PATENT DOCUMENTS

| | | |
|---|---|---|
| 6,436,177 B1 | 8/2002 | Nakayama |
| 2002/0016413 A1 | 2/2002 | Nakao et al. |
| 2013/0245160 A1 | 9/2013 | Shimada et al. |
| 2017/0145244 A1 | 5/2017 | Yang et al. |

FOREIGN PATENT DOCUMENTS

| | | |
|---|---|---|
| CN | 105324447 | 2/2016 |
| JP | 2000344988 | 12/2000 |
| JP | 200539702 | 2/2005 |
| JP | 04012594 B2 | 11/2007 |
| JP | 04424777 B2 | 3/2010 |
| JP | 5036251 B2 | 9/2012 |
| WO | 2014190515 | 12/2014 |
| WO | 2014190516 | 12/2014 |
| WO | 2016095583 A1 | 6/2016 |

OTHER PUBLICATIONS

"Linolenic acid hydrazide", Pub. Chem, National Library of Medicine, Jun. 7, 2010; 2 pages.
European Search Report for the corresponding European Patent Application No. 17925800.9, dated May 26, 2021; 8 pages.

*Primary Examiner* — Wenwen Cai
(74) *Attorney, Agent, or Firm* — Karl E. Stauss

(57) ABSTRACT

An aqueous polymer composition comprising a multiethylenically unsaturated carboxylic acid monohydrazide and a keto-functionalized polymer, and an aqueous coating composition comprising such aqueous polymer composition and providing coatings with improved water resistance and alcohol resistance without compromising early block resistance.

11 Claims, No Drawings

AQUEOUS POLYMER COMPOSITION

FIELD OF THE INVENTION

The present invention relates to an aqueous polymer composition and an aqueous coating composition comprising the same.

INTRODUCTION

Aqueous or waterborne coating compositions are becoming increasingly more important than solvent-based coating compositions for less environmental problems. Chemical resistance and handling properties of waterborne acrylic latexes are important properties for many applications such as architectural and industrial coatings. Coatings are typically required to have both water resistance and 48% alcohol resistance, which are more difficult to achieve on a black substrate than on a clear substrate. WO 2014/190515 A1 discloses a polymer dispersion and a wood coating composition comprising thereof to improve water repellency while maintaining coating properties including alcohol resistance, clarity and hardness. Such polymer dispersion comprises polymer particles comprising, as polymerized units, a (meth) acrylate $C_6$-$C_{22}$ alkyl ester nonionic monomer and a self-crosslinking monomer such as diacetone acrylamide; adipic dihydrazide (ADH); a reactive silicone; and a reactive surfactant. However, there still has room to further improve water resistance and/or alcohol resistance. Moreover, waterborne coatings need to have satisfactory handling properties. For example, an early block resistance rating of B or better according to the GB/T 23982-2009 standard increases production efficiency and avoids potential coatings damages when separating two coated surfaces that are stacked or placed in contact with one another during storage, packaging and/or shipping. It is particularly challenging to balance handling properties and chemical resistance on a black substrate in matt formulations. In addition, coatings need to have sufficient hardness and flexibility to meet industry requirements.

Therefore, it is desirable to provide an aqueous polymer composition particularly useful for coating applications that is able to provide coating films with improved water resistance and alcohol resistance without compromising other desirable properties described above.

SUMMARY OF THE INVENTION

The present invention provides an aqueous polymer composition by including, a specific unsaturated carboxylic acid monohydrazide, into a keto-functionalized polymer. An aqueous coating composition comprising such aqueous polymer composition provides coatings with better water resistance and improved alcohol resistance while maintaining good early block resistance, as compared to coating compositions comprising conventional polyhydrazides.

In a first aspect, the present invention includes an aqueous polymer composition, comprising:

a polymer comprising structural units of a keto-containing (meth)acrylamide; and a multiethylenically unsaturated aliphatic $C_5$-$C_{36}$ carboxylic acid monohydrazide.

In a second aspect, the present invention includes use of a multiethylenically unsaturated aliphatic $C_5$-$C_{36}$ carboxylic acid monohydrazide as a crosslinker in an aqueous coating composition comprising a polymer, wherein the polymer comprises structural units of a keto-containing (meth)acrylamide.

In a third aspect, the present invention includes an aqueous coating composition comprising an aqueous polymer composition of the first aspect, and at least one component selected from the group consisting of a coalescent, a wetting agent, a thickener, a defoamer, a matting agent, a pigment, and an extender.

DETAILED DESCRIPTION OF THE INVENTION

"Acrylic" as used herein includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

As used herein, the term structural units, also known as polymerized units, of the named monomer refers to the remnant of the monomer after polymerization, or the monomer in polymerized form. For example, a structural unit of methyl methacrylate is as illustrated:

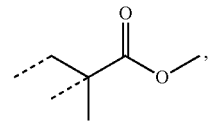

where the dotted lines represent the points of attachment of the structural unit to the polymer backbone.

The aqueous polymer composition of the present invention comprises a polymer, typically an emulsion polymer. The polymer comprises structural units of one or more keto-containing (meth)acrylamides. Examples of suitable keto-containing (meth)acrylamides include diacetone acrylamide, diacetone methacrylamide, diacetone ethacrylamide, or mixtures thereof. Preferred keto-containing (meth) acrylamide is diacetone acrylamide. The polymer may comprise, by weight based on the weight of the polymer, 0.1% or more, 0.5% or more, 1% or more, or even 1.5% or more, and at the same time 20% or less, 15% or less, 10% or less, 5% or less, or even 3% or less, of structural units of the keto-containing (meth)acrylamide. "Weight of the polymer" in the present invention refers to the dry or solid weight of the polymer.

The polymer in the aqueous polymer composition may also comprise structural units of one or more monoethylenically unsaturated ionic monomers. The term "ionic monomers" herein refers to monomers that bear an ionic charge between pH=1-14. The monoethylenically unsaturated ionic monomers may include α, β-ethylenically unsaturated carboxylic acids such as acrylic acid, methyl acrylic acid, itaconic acid, crotonic acid, acyloxypropionic acid, maleic acid, and fumaric acid; and/or their anhydrides, for example, (meth)acrylic anhydride, maleic anhydride, or mixtures thereof; phosphate monomers such as phosphate ethyl (methyl)acrylate, 2-phosphopropyl (meth)acrylate, 3-phospho-2-hydroxypropyl (meth)acrylate, and SIPOMER PAM-100, SIPOMER PAM-200, SIPOMER PAM-300, and SIPOMER COPS-3 all available from Solvay S. A.; sulfonate monomers such as sodium styrene sulfonate (SSS) and sodium vinyl sulfonate (SVS) and acrylamido-2-methylpropanesulfonic acid (AMPS); or mixtures thereof. Preferred monoethylenically unsaturated ionic monomers are selected from the group consisting of acrylic acid, methyl acrylic acid, itaconic acid, crotonic acid, acyloxypropionic acid, maleic acid, phosphate ethyl acrylate, sodium styrene sulfonate (SSS), and fumaric acid. The polymer may comprise, by weight based on the weight of the polymer, 0.1% or more, 0.5% or more, 1% or more, or even 2% or more, and at the same time, 20% or less, 10% or less, 8% or less, or even 5% or less, of structural units of the monoethylenically unsaturated ionic monomer.

The polymer in the aqueous polymer composition may further comprise structural units of one or more monoethylenically unsaturated nonionic monomers excluding the keto-containing (meth)acrylamide described above. The term "nonionic monomers" herein refers to monomers that do not bear an ionic charge between pH=1-14. Suitable examples of the monoethylenically unsaturated nonionic monomers may include, for example, alkyl esters of (meth) acrylic acids, for example, $C_1$-$C_{22}$, $C_4$-$C_{16}$, or $C_8$-$C_{10}$ (meth) acrylic ester monomers such as methyl acrylate, ethyl acrylate, butyl acrylate, 2-ethylhexyl acrylate, decyl acrylate, lauryl acrylate, methyl methacrylate, butyl methacrylate, butyl acrylate, isodecyl methacrylate, lauryl methacrylate, hydroxy-functional (meth)acrylic acid alkyl ester such as hydroxyethyl methacrylate, hydroxypropyl methacrylate, or mixtures thereof; (meth)acrylonitrile; (meth)acrylamide; amino-functional and ureido-functional monomers such as hydroxyethyl ethylene urea methacrylate; cycloalkyl (meth) acrylates such as cyclohexyl(meth)acrylate, methcyclohexyl acrylate, isobornyl methacrylate, isobornyl acrylate, and dihydrodicyclopentadienyl acrylate; ethylene, propylene, α-olefins such as 1-decene; styrene; vinyl acetate, vinyl butyrate, vinyl versatate or other vinyl esters; or combinations thereof. Preferably, the monoethylenically unsaturated nonionic monomer is selected from the group consisting of methyl methacrylate, ethyl acrylate, butyl methacrylate, butyl acrylate, 2-ethylhexyl acrylate, and styrene. The polymer may comprise, by weight based on the weight of the polymer, from 60% to 99%, from 80% to 98%, from 85% to 96%, or from 90% to 95%, of structural units of the monoethylenically unsaturated nonionic monomer.

The polymer in the aqueous polymer composition may further comprise structural units of one or more multiethylenically unsaturated monomers. Examples of suitable multiethylenically unsaturated monomers include butadiene, allyl(meth)acrylate, allyl (meth)acrylamide, divinyl benzene, ethylene glycol dimethacrylate, allyl oxyethyl (meth) acrylate, crotyl (meth)acrylate, diallyl maleate, butylene glycol dimethacrylate, or mixtures thereof. The polymer may comprise, by weight based on the weight of the polymer, from 0.01% to 10%, from 0.1% to 5%, from 0.5% to 4%, or from 1% to 3%, of structural units of the multiethylenically unsaturated monomer.

The polymer in the aqueous polymer composition can be a multistage polymer obtained by multistage free-radical polymerization using the monomers described above, which at least two stages are formed sequentially, resulting in the formation of the multistage polymer comprising at least two polymer compositions. The multistage polymer may comprise:

a polymer (i) comprising structural units of the multiethylenically unsaturated monomer, structural units of the monoethylenically unsaturated ionic monomer including, for example, methyl acrylic acid and acrylic acid, and structural units of the monoethylenically unsaturated nonionic monomer; and a polymer (ii) comprising, structural units of the keto-containing (meth)acrylamide, structural units of the monoethylenically unsaturated ionic monomer including, for example, methyl acrylic acid and acrylic acid, and structural units of the monoethylenically unsaturated nonionic monomer. In one embodiment, the polymer (i) comprises, by weight based on the weight of the polymer (i), from 0 to 10% of the monoethylenically unsaturated ionic monomer; and the polymer (ii) comprises, by weight based on the weight of the polymer (ii), from 5% to 15% of structural units of the monoethylenically unsaturated ionic monomer. The weight ratio of the polymer (i) to polymer (ii) may be in the range of from 10/90 to 90/10, from 20/80 to 80/20, from 30/70 to 70/30, from 40/60 to 60/40, from 45/55 to 55/45, or from 50/50 to 55/45.

The types and levels of the monomers described above for preparing the polymer may be chosen to provide the polymer with a glass transition temperature (Tg) of −30° C. or more, −20° C. or more, −15° C. or more, −10° C. or more, 0° C. or more, or even 5° C. or more, and at the same time, 40° C. or less, 35° C. or less, or even 30° C. or less. $T_g$s of the polymers are calculated herein by using the Fox equation (T. G. Fox, Bull. Am. Physics Soc., Volume 1, Issue No. 3, page 123 (1956)). That is, for calculating the Tg of a copolymer of monomers $M_1$ and $M_2$, $$1/T_g(\text{calc.}) = w(M_1)/T_g(M_1) + w(M_2)/T_g(M_2),$$

wherein $T_g(\text{calc.})$ is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of $M_1$, $T_g(M_2)$ is the glass transition temperature of the homopolymer of $M_2$; and all temperatures being in K. The glass transition temperatures of the homopolymers may be found, for example, in "Polymer Handbook", edited by J. Brandrup and E. H. Immergut, Interscience Publishers.

The polymer in the aqueous polymer composition may have an average particle size of from 50 nanometers (nm) to 500 nm, from 80 nm to 200 nm, or from 90 nm to 150 nm, as measured by a Brookhaven BI-90 or 90Plus Particle Sizer.

The aqueous polymer composition of the present invention further comprises one or more multiethylenically unsaturated aliphatic $C_5$-$C_{36}$ carboxylic acid monohydrazides. "Monohydrazide" refers to a compound containing only one hydrazine group. The multiethylenically unsaturated carboxylic acid monohydrazide may contain two or three or more carbon-carbon double bonds. The unsaturated carboxylic acid monohydrazide may comprise conjugated double bonds, preferably three or more conjugated double bonds. The unsaturated carboxylic acid monohydrazide useful in the present invention may have the structure represented by formula (I) or (II),

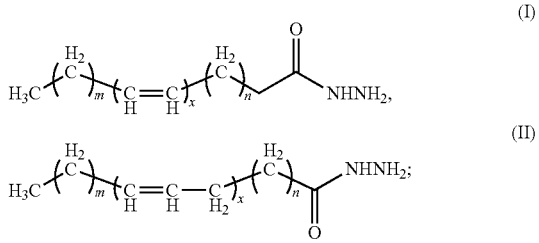

wherein each m is independently an integer from 0 to 24, preferably from 2 to 12; each n is independently an integer from 0 to 24, preferably from 2 to 12; and each x is independently an integer from 2 to 8, preferably from 2 to 3. The unsaturated carboxylic acid monohydrazide can be a mixture of a compound of the structure of formula (I) and a compound of the structure of formula (II). Preferred unsaturated carboxylic acid monohydrazide has the structure represented by formula (I).

The unsaturated carboxylic acid monohydrazide useful in the present invention may have from 5 to 36, from 8 to 32, from 10 to 30, or from 12 to 24 carbon atoms. Examples of suitable unsaturated carboxylic acids include eleostearic acid, α-linolenic acid, linoleic acid, stearidonic acid, or mixtures thereof. The unsaturated carboxylic acid monohydrazide acts as a crosslinker during film formation from the aqueous polymer composition. When water in the aqueous polymer composition evaporates, without being bound by theory, it is believed that the hydrazide group in the monohydrazide reacts with the carbonyl group in the polymer, so that the polymer is grafted with the hydrophobic oil chain (that is, the unsaturated aliphatic chain in the monohydrazide) which is then slowly cured by oxidation to form crosslinked films. The aqueous polymer composition may comprise the unsaturated carboxylic acid monohydrazide in an amount of 0.1% or more, 0.5% or more, 1% or more, 1.5% or more, or even 2% or more, and at the same time, 10% or less, 8% or less, 7% or less, 5% or less, or even 4% or less, by weight based on the weight of the polymer.

The aqueous polymer composition of the present invention may be prepared by free-radical polymerization, such as emulsion polymerization or suspension polymerization, of the monomers described above to form the polymer, followed by adding the carboxylic acid monohydrazide. Emulsion polymerization is a preferred process. Total weight concentration of the monomers for preparing the polymer is equal to 100%. A mixture of the monomers may be added neat or as an emulsion or a suspension in water; or added in one or more additions or continuously, linearly or nonlinearly, over the reaction period of preparing the polymer. Temperature suitable for emulsion polymerization may be lower than 100° C., in the range of from 30° C. to 95° C., or in the range of from 50° C. to 90° C. Multistage free-radical polymerization using the monomers described above can be used, which at least two stages are formed sequentially, and usually results in the formation of the multistage polymer comprising at least two polymer compositions. In some embodiments, the polymer useful in the present invention is prepared by multistage emulsion polymerization.

In the polymerization process of preparing the polymer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process for preparing the polymer, one or more surfactants may be used. The surfactant may be added prior to or during the polymerization of the monomers, or combinations thereof. A portion of the surfactant can also be added after the polymerization. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated polymerizable surfactants; and ethoxylated alcohols or phenols. In some preferred embodiments, the alkali metal or ammonium salts of alkyl, aryl, or alkylaryl sulfates are used. The surfactant used is usually from 0.1% to 3% by weight, preferably from 0.5% to 1.5% by weight, based on the weight of total monomers used for preparing the polymer.

In the polymerization process of preparing the polymer, a chain transfer agent may be used. When multistage polymerization is used, e.g., the multistage polymer is obtained, the chain transfer agent is preferably used in preparing the polymer (ii) comprising in polymerized form, the keto-containing (meth)acrylamide. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the polymer. The chain transfer agent may be used in an amount of from 0 to 5% by weight, from 0.1% to 2% by weight, or from 0.2% to 1% by weight, based on the total weight of monomers used for preparing the polymer.

After completing the polymerization of the polymer, the obtained dispersion may be neutralized by one or more bases as neutralizers to a pH value, for example, at least 6, from 6 to 10, or from 7 to 9. The bases may lead to partial or complete neutralization of the ionic or latently ionic groups of the polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof. Then the unsaturated carboxylic acid monohydrazide is added to the above obtained aqueous dispersion to obtain the aqueous polymer composition of the present invention.

The present invention also relates to an aqueous coating composition comprising the aqueous polymer composition and at least one component described below. The aqueous polymer composition may be present, by solids weight based on the total weight of the aqueous coating composition, in an amount of from 20% to 90%, from 40% to 80%, or from 60% to 70%.

The aqueous coating composition of the present invention may also comprise one or more pigments and/or extenders. As used herein, the term "pigment" refers to a particulate inorganic material which is capable of materially contributing to the opacity or hiding capability of a coating. Such materials typically have a refractive index greater than 1.8. Examples of suitable pigments include titanium dioxide ($TiO_2$), zinc oxide, zinc sulfide, iron oxide, barium sulfate, barium carbonate, or mixtures thereof. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 0 to 40%, from 0 to 20%, 15% or less, 10% or less, or even 5% or less. In one embodiment, the aqueous coating composition is substantially free of the pigment or extender (e.g., PVC of 1% or less, 0.5% or less, 0.1% or less, or even zero). PVC of a coating composition may be determined according to the following equation:

$$PVC = \frac{\text{volume of pigment(s)} + \text{volume of extender(s)}}{\text{total dry volume of coating composition}} * 100\%$$

The aqueous coating composition of the present invention may comprise one or more matting agents. "Matting agents" herein refer to any inorganic or organic particles that provide matt effect. Matting agents usually have an average particle size of 5.5 microns or more according to the ASTM E2651-10 method. The matting agents may be selected from silica matting agents, polyurea matting agents, polyacrylate, polyethylene, polytetrafluoroethene, or mixtures thereof. Suitable commercially available matting agents include, for example, ACEMATT TS-100 and ACEMATT OK520 silica matting agents both available from Evonik, DEUTERON MK polyurea matting agent available from Deuteron, SYLOID Silica 7000 matting agent available from Grace Davison, PARALOID™ PRD 137B emulsion based on polyacrylate available from The Dow Chemical Company (PARALOID is a trademark of The Dow Chemical Company); ULTRALUBE D277 emulsion based on HDPE/plastic, ULTRALUBE D818 emulsion based on montan/PE/plastic, and ULTRALUBE D860 emulsion based on PE/ester matting agents all available from Keim-Additec; or mixtures thereof. The matting agent may be present, by solids weight based on the total weight of the aqueous coating composition, in an amount of from 0 to 10%, from 0.5% to 5%, or from 1% to 2%.

The aqueous coating composition of the present invention may further comprise one or more defoamers. "Defoamers" herein refers to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The defoamer may be present, by weight based on the total weight of the aqueous coating composition, in an amount of from 0 to 0.5%, from 0.1% to 0.3%, or from 0.1% to 0.2%.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is based on HEUR. The thickener may be present, by weight based on the total weight of the aqueous coating composition, in an amount of from 0 to 1%, from 0.1% to 0.8%, or from 0.3% to 0.5%.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, SURFYNOL 104 nonionic wetting agent based on an actacetylenic diol available from Air Products, BYK-346 and BYK-349 polyether-modified siloxanes both available from BYK, or mixtures thereof. The wetting agent may be present, by weight based on the total weight of the aqueous coating composition, in an amount of from 0 to 0.8%, from 0.1% to 0.5%, or from 0.1% to 0.2%.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescent may be present, by weight based on the total weight of the aqueous coating composition, in an amount of from 0 to 25%, from 1% to 10%, or from 3% to 8%.

The aqueous coating composition of the present invention may further comprise water. The concentration of water may be, by weight based on the total weight of the aqueous coating composition, from 30% to 90%, from 40% to 80%, or from 60% to 70%.

In addition to the components described above, the aqueous coating composition of the present invention may further comprise any one or combination of the following additives: buffers, neutralizers, dispersants, humectants, mildewcides, biocides, anti-skinning agents, colorants, flowing agents, anti-oxidants, plasticizers, leveling agents, adhesion promoters, and grind vehicles. When present, these additives may be present in a combined amount of from 0 to 2%, from 0.1% to 1.5%, or from 0.5% to 1%, by weight based on the total weight of the aqueous coating composition.

The aqueous coating composition of the present invention may be prepared with techniques known in the coating art. The process of preparing the aqueous coating composition of the present invention may comprise admixing the aqueous polymer composition with the optional components described above. Components in the aqueous coating composition may be mixed in any order to provide the aqueous coating composition of the present invention. Any of the above-mentioned optional components may also be added to the composition during or prior to the mixing to form the aqueous coating composition.

A process of using the aqueous coating composition of the present invention may comprise the following: applying the aqueous coating composition to a substrate, and drying the applied coating composition. The aqueous coating composition can be applied to, and adhered to, various substrates. Examples of suitable substrates include wood, metals, plastics, foams, stones, elastomeric substrates, glass, fabrics, concrete, or cementious substrates. The aqueous coating composition can be applied to a substrate by incumbent means including brushing, dipping, rolling and spraying. The coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition has been applied to a substrate, the coating composition may be dried, or be allowed to dry, at temperature from 5° C. to 25° C., or at an elevated temperature, for example, from 35° C. to 60° C. to form a film (this is, coating).

The aqueous coating composition of the present invention can provide a coating made therefrom with surprisingly good water resistance as indicated by a water resistance rating of 4 or higher, even when coated on a black substrate, and good alcohol resistance, for example, an alcohol resistance rating of 4 or higher, without compromising early block resistance, for example, an early block resistance rating of B or better. In some embodiments, the coating also shows a pencil hardness of HB or harder and/or flexibility >15 millimeters (mm). These properties are measured according to the test methods described in the Examples section below.

The aqueous coating composition of the present invention is suitable for various coating applications, such as marine and protective coatings, automotive coatings, wood coatings, coil coatings, plastic coatings, powder coatings, can coatings, and civil engineering coatings. The aqueous coating composition is particularly suitable for wood coatings. More preferably, the aqueous coating composition is suitable for clear coatings which are substantially free of pigments and/or extenders. The aqueous coating composition can be used alone, or in combination with other coatings to form multi-layer coatings.

The present invention also relates to use of the multiethylenically unsaturated aliphatic $C_5$-$C_{36}$ carboxylic acid monohydrazide as a crosslinker in an aqueous coating composition comprising the polymer. The aqueous coating composition comprising the mixture of the unsaturated aliphatic carboxylic acid monohydrazide and the polymer, upon drying or allowing to dry, forms crosslinked films. The aqueous coating composition of the present invention may further comprise at least one or more of the coalescent, the wetting agent, the thickener, the defoamer, the matting agent, the pigment and the extender as described above in the aqueous coating composition section above. The use of the unsaturated aliphatic carboxylic acid monohydrazide in combination with the polymer comprising structural unis of at least one keto-containing (meth)acrylamide above may provide a coating obtained therefrom with better water resistance and better alcohol resistance than coatings including the polymer and a polyhydrazide. The coating may also show comparable early block resistance, pencil hardness, and/or flexibility as a coating obtained from aqueous coating compositions comprising the polymer and the polyhydrazide.

Examples

Some embodiments of the invention will now be described in the following Examples, wherein all parts and percentages are by weight unless otherwise specified.

Methyl methacrylate (MMA), butyl acrylate (BA), 2-Ethylhexyl acrylate (2-EHA), styrene (ST), methacrylic acid (MAA), allyl methacrylate (ALMA), 3-Mercaptopropionic acid (3-MPA) used as a chain transfer agent (CTA), ammonium persulfate (APS), and ammonia (25%) are all available from Sinoreagent Group.

Diacetone acrylamide (DAAM) and adipic dihydrazide (ADH) are both available from Kyowa Hakko Chemical Co., Ltd.

Eleostearic acid (also known as "Tung oil"), hydrazine hydrate, and ethanol are all available from Sinoreagent Group.

Rhodacal DS-4 ("DS-4") surfactant, available from Solvay S. A., is sodium dodecyl benzene sulfonate.

DOWANOL™ DPnB glycol ether, available from The Dow Chemical Company, is dipropylene glycol n-butyl ether and used as a coalescent.

DOWANOL EB, available from The Dow Chemical Company, is butyl ethyl ether and used as a coalescent.

TEGO Airex 902 W defoamer is available from Tego.

BYK-346 wetting agent is available from BYK.

DEUTERON MK matting agent, available from Deuteron, is based on polyurea powder and has a D50 particle size of 6.3 microns.

ACRYSOL™ RM-8W rheology modifier is available from The Dow Chemical Company.

DOWANOL and ACRYSOL are trademarks of The Dow Chemical Company.

The following standard analytical equipment and methods are used in the Examples.

Water Resistance and Alcohol Resistance Tests

Wood panels were prepared by brush applying three layers of a test coating composition at 80-90 grams per square meter (g/m²) for each layer over wood plates. After the first coat, the coating was left at room temperature (23-25° C.) for 4 hours and then sanded. Then the second coat was applied and dried at room temperature for 4 hours. After the third coat, the wood panels were dried at room temperature for 4 hours, and then placed in an oven at 50° C. for 48 hours before testing.

Water resistance and alcohol resistance were determined by the BS EN 12720-2009 method (Furniture—Assessment of surface resistance to cold liquids, 2009).

For the water resistance test, disc type filter paper was first saturated with deionized (DI) water, and then placed on the above prepared wood panels and covered with a cap to reduce evaporation. After 24 hours, the cap and the filter paper were removed. Tested areas were wiped with wet facial tissues. The test surface was examined for the degree of damage after drying at room temperature for another 24 hours. The degree of damage was defined as rating levels below according to BS EN 12720-2009. The higher the rating level, the better the water resistance. The water resistance being 4 or higher is acceptable.

For the alcohol resistance test, disc type filter paper was first saturated with 48% ethanol aqueous solution, and then placed on the above prepared wood panels and covered with a cap to reduce evaporation. After 1 hour, the cap and the filter paper were removed. Tested areas were wiped with wet facial tissues. The test surface was examined for the degree of damage after drying at room temperature for another 24 hours. The degree of damage was defined as rating levels below according to BS EN 12720-2009. The higher the rating level, the better the alcohol resistance. The alcohol resistance being 4 or higher is acceptable.

The following rating levels are used to rate water resistance and alcohol resistance, respectively.

5—No change: Test area indistinguishable from adjacent surrounding area;

4—Minor change: Test area distinguishable from adjacent surrounding area, only when the light source is mirrored on the test surface and is reflected towards the observer's eye, for example, discoloration, change in gloss and color; no change in the surface structure such as swelling, fiber raising, cracking, blistering;

3—Moderate change: Test area distinguishable from adjacent surrounding area, visible in several viewing directions, for example, discoloration, change in gloss and color; no change in the surface structure such as swelling, fiber raising, cracking, and/or blistering;

2—Significant change: Test area clearly distinguishable from adjacent surrounding area, visible in all viewing directions, for example, discoloration, change in gloss and color; and/or slightly change in the surface structure such as swelling, fiber raising, cracking and/or blistering;

1—Strong change: The structure of the surface being distinctly changed and/or discoloration, change in gloss and color, and/or the surface material being totally or partially removed, and/or the filter paper adhering to the surface.

Pencil Hardness

Pencil hardness was measured according to the GB/T 6739-2006 method (Paints and varnishes-Determination of film hardness by pencil test, China National Standardization Administration Committee, 2006). Pencil hardness was tested on glass panels with a Mitsubishi pencil. A 120 μm thick wet film was prepared by applying a test coating composition using a drawdown applicator on a glass plate and cured in an oven at 50° C. for 48 hours. The pencil hardness was rated as the hardest pencil that will not rupture or scratch the film. The hardness of the pencil was: 6H, 5H, 4H, 3H, 2H, H, F, HB, B, 2B, 3B, 4B, 5B, 6B, where 6H was the hardest, 6B was the softest. A pencil hardness of HB or harder is acceptable.

Flexibility

The flexibility was measured according to the GB/T 1731-1993 method (Determination of flexibility of films, China National Standardization Administration Committee, 1993). A test coating composition was applied onto tin plate panels by drawdown with 120 μm wet film thickness. Only one coat was applied. The coating on the tin plate was dried at room temperature for 1 hour and then placed in an oven at 50° C. for 24 hours before testing. Flexibility >15 mm is acceptable.

Early Block Resistance

Early block resistance was measured according to the GB/T 23982-2009 method (Test method for block resistance of wood coatings, China National Standardization Administration Committee, 2009).

A wood block (7 cm×5 cm) was balanced at room temperature and 50% humidity for 7 days. One layer of coating was brushed onto the wood block at 80-90 g/m² of the wood, cured at room temperature for 3 hours, and then sanded with sand paper. The second coating layer was brushed onto the wood block at 80-90 g/m² and cured at room temperature for 24 hours. Two coated wood blocks were then stacked together face to face with 1 kg weight on them and are placed into an oven at 50° C. for 4 hours. Then, the 1 kg weight was removed and the two stacked wood blocks were balanced at room temperature for 1 hour. The two stacked wood blocks were then separated from each other to evaluate the early block resistance.

The rating of the early block resistance property is defined by the separating force and the area of damaging:

A: separated without any force;
B: separated by a slight blow;
C: separated by low force with hands;
D: separated by medium force with hands;
E: separated by huge force with hands;
F: separated by tools The number means area of damage: 0: no damage; 1: ≤1%; 2: 1%-5%; 3: 5%-20%; 4: 20%-50%; 5: ≥50%. A-0 represents the best and F-5 is the worst. The early block resistance>=B is acceptable.

Synthesis of Tung Oil Acid Hydrazide

In a flask, 45 g of hydrazine hydrate was dissolved into 350 ml ethanol, and then 87 g of tung oil was slowly added with stirring. Under nitrogen atmosphere, the resultant mixture was refluxed at about 80° C. for 48 hours, and cooled down to room temperature to give a white solid product of tung oil acid hydrazide (TOAH) through filtration. The product had little solubility in water but it could dissolve in ethylene glycol butyl ether at 10% active ingredients. The structure of TOAH as shown below was confirmed by $^1$HNMR and LC-MS. $^1$HNMR (in d-Dimethyl Sulfoxide (d-DMSO), 400 MHz): 8.89 (1H, s); 5.20-6.50 (6H, m); 4.13 (2H, s); 1.20-2.20 (23H, m). MS for $C_{18}H_{32}N_2O$: (M⁺) 292. TOAH has the following structure:

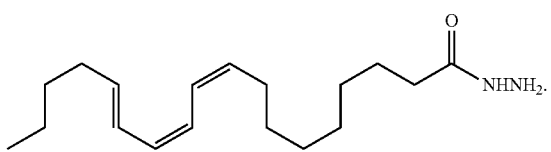 [SMILES: CCCC/C=C/C=C\C=C/CCCCCCCC(=O)NN]

Comparative (Comp) Example (Ex) A

Preparation of Monomer Emulsion 1: DS-4 surfactant (24 g, 22.5% by weight (wt %) solids) was dissolved in DI water (235 g) with stirring. Then BA (193 g), ALMA (44 g), MMA (623 g), and MAA (18 g) were slowly added into the resulting surfactant solution to obtain Monomer Emulsion 1.

Preparation of Monomer Emulsion 2: DS-4 surfactant (24 g, 22.5 wt % solids) was dissolved in DI water (295 g) with stirring. Then 2-EHA (360 g), MMA (285 g), ST (3 g), DAAM (38 g), MAA (61 g) and 3-MPA (2 g) were added into the resultant surfactant solution to obtain Monomer Emulsion 2.

A solution containing DS-4 surfactant (39 g, 22.5 wt % solids) and DI water (1080 g) was added into a 4-neck, 5 liter round bottom flask equipped with a thermocouple, a cooling condenser and an agitator, and was heated to 85° C. under nitrogen atmosphere. An aqueous solution of sodium carbonate (2.7 g) dissolved in DI water (75 g), an aqueous initiator solution of APS (2.7 g) dissolved in DI water (30 g), and 5 wt % of the Monomer Emulsion 1 obtained above were then added into the flask. Within about 5 minutes, initiation of polymerization was confirmed by a temperature increase by 6° C. and a change of the external appearance of the reaction mixture. After heat generation stopped, the remaining Monomer Emulsion 1 was added gradually to the flask over a period of 45 minutes with stirring, and the temperature was maintained at 84-86° C. The Monomer Emulsion 2 obtained above was then added into the flask in the same manner as the Monomer Emulsion 1 over 45 minutes. Upon completing addition, the reaction mixture was held at 70° C. for 60 minutes, then cooled down to 50° C. and neutralized to a pH value of 7.0-8.0 by a 25% aqueous ammonia solution. The obtained mixture was held at 45-50° C. for 10 minutes and was cooled down to room temperature to obtain the acrylic copolymer emulsion. The obtained polymer latex had a solids content of 41.5% and an average particle size of 92 nm.

Example (Ex) 1 Aqueous Polymer Composition

The aqueous polymer composition of Ex 1 was prepared by adding 6.5 g of TOAH into 1,000 g of the above prepared polymer latex in Comp Ex A.

Ex 2 Aqueous Polymer Composition

The aqueous polymer composition of Ex 2 was prepared by adding 13 g of TOAH into 1,000 g of the above prepared polymer latex in Comp Ex A.

Comp Ex B Aqueous Polymer Composition

The aqueous polymer composition of Comp Ex B was prepared by adding 1.9 g of ADH into 1,000 g of the above prepared polymer latex in Comp Ex A.

Comp Ex C Aqueous Polymer Composition

The aqueous polymer composition of Comp Ex C was prepared by adding 3.9 g of ADH into 1,000 g of the above prepared polymer latex in Comp Ex A.

Comp Ex D Aqueous Polymer Composition

Preparation of Monomer Emulsion 1: DS-4 surfactant (24 g, 22.5 wt % solids) was dissolved in DI water (235 g) with stirring. Then BA (128 g), ALMA (44 g), MMA (691 g), and MAA (18 g) were slowly added into the resulting surfactant solution to obtain Monomer Emulsion 1.

Preparation of Monomer Emulsion 2: DS-4 surfactant (24 g, 22.5 wt % solids) was dissolved in DI water (295 g) with stirring. Then 2-EHA (263 g), MMA (381 g), ST (3 g), DAAM (38 g), and MAA (61 g) were added into the resultant surfactant solution to obtain Monomer Emulsion 2.

A solution containing DS-4 surfactant (39 g, 22.5 wt % solids) and DI water (1080 g) was added into a 4-neck, 5 liter round bottom flask equipped with a thermocouple, a cooling condenser and an agitator, and was heated to 85° C. under nitrogen atmosphere. An aqueous solution of sodium carbonate (2.7 g) dissolved in DI water (75 g), an aqueous initiator solution of APS (2.7 g) dissolved in DI water (30 g), and 5 wt % of the Monomer Emulsion 1 obtained above were then added into the flask. Within about 5 minutes, initiation of polymerization was confirmed by a temperature increase by 6° C. and a change of the external appearance of the reaction mixture. After heat generation stopped, the remaining Monomer Emulsion 1 was added gradually to the flask over a period of 45 minutes with stirring, and the temperature was maintained at 84-86° C. The Monomer Emulsion 2 obtained above was then added into the flask in the same manner as the Monomer Emulsion 1 over 45 minutes. Upon completing addition, the reaction mixture was held at 70° C. for 60 minutes, then cooled down to 50° C. and neutralized to a pH value of 7.0-8.0 by a 25% aqueous ammonia solution. The obtained mixture was held at 45-50° C. for 10 minutes and was cooled down to room temperature to obtain the acrylic copolymer emulsion. The obtained polymer latex had a solids content of 41.6% and an average particle size of 94 nm.

Ex 3 Aqueous Polymer Composition

The aqueous polymer composition of Ex 3 was prepared by adding 13 g of TOAH into 1,000 g of the above prepared polymer latex in Comp Ex D.

Comp Ex E Aqueous Polymer Composition

The aqueous polymer composition of Comp Ex E was prepared by adding 3.9 g of ADH into 1,000 g of the above prepared polymer latex in Comp Ex D.

Composition and properties of the above obtained aqueous polymer compositions are given in Table 1.

TABLE 1

Aqueous polymer compositions comprising acrylic binders

| Sample | Polymer (stage 1 polymer[a]//stage 2 polymer[b]) | Post-added crosslinker (mole ratio) | MFFT[d] |
|---|---|---|---|
| Ex 1 | 50% (71MMA/22BA/5ALMA/2MAA)// | TOAH (TOAH/DAAM = 0.2) | <10° C. |
| Ex 2 | 50% (37MMA/3ST/47EHA/5DAAM/8MAA | TOAH (TOAH/DAAM = 0.4) | <15° C. |
| Comp Ex A | with 0.3% CTA); | No crosslinker | 53° C. |
| Comp Ex B | $T_g^c$ = 18° C. | ADH (ADH/DAAM = 0.2) | 60° C. |
| Comp Ex C | | ADH (ADH/DAAM = 0.4) | 58° C. |

TABLE 1-continued

Aqueous polymer compositions comprising acrylic binders

| Sample | Polymer (stage 1 polymer[a]//stage 2 polymer[b]) | Post-added crosslinker (mole ratio) | MFFT[d] |
|---|---|---|---|
| Comp Ex D | 50% (78.5MMA/14.5BA/5ALMA/2MAA)// | No crosslinker | 55° C. |
| Comp Ex E | 50%(50MMA/2.5ST/34.5EHA/5DAAM/8 MAA); | ADH (ADH/DAAM = 0.4) | 15° C. |
| Ex 3 | $T_g^c$ = 37° C. | TOAH (TOAH/DAAM = 0.4) | 15° C. |

[a]% by weight based on the weight of stage 1 polymer;
[b]% by weight based on the weight of stage 2 polymer;
[c]$T_g$ was calculated by the Fox equation;
[d]Minimum film formation temperature (MFFT) was measured according to the GB/T 9267-2008 method (Emulsions for coatings and polymer dispersions for coatings and plastics-Determination of white point temperature and minimum film-forming temperature, China National Standardization Administration Committee, 2008)

Coating Compositions

The above obtained aqueous polymer compositions were used as binders in preparing coating compositions below. Coating compositions (Coating-1 through Coating-3 and Comp Coating-A through Comp Coating-E) were prepared based on formulations described in Table 2. The ingredients listed in Table 2 were mixed using a conventional lab mixer. Properties of the obtained coating compositions were measured according to the test methods described above and are given in Tables 3 and 4.

TABLE 2

Wood coating compositions

| Materials, gram | Comp Coating-A | Comp Coating-B | Comp Coating-C | Comp Coating-D | Comp Coating-E | Coating-1 | Coating-2 | Coating-3 |
|---|---|---|---|---|---|---|---|---|
| Binder | | | | | | | | |
| Comp Ex A | 79 | | | | | | | |
| Comp Ex B | | 79 | | | | | | |
| Comp Ex C | | | 79 | | | | | |
| Comp Ex D | | | | 76.8 | | | | |
| Comp Ex E | | | | | 86.9 | | | |
| Ex 1 | | | | | | 79 | | |
| Ex 2 | | | | | | | 67.7 | |
| Ex 3 | | | | | | | | 85.5 |
| Water | 10.1 | 10.1 | 10.1 | 12.8 | 8.7 | 10.1 | 29.9 | 10.1 |
| DOWANOL EB | 4 | 4 | 4 | 3 | 0.5 | 4 | 0.5 | 0.5 |
| DOWANOL DPnB | 3.5 | 3.5 | 3.5 | 4 | 0.5 | 3.5 | 0.5 | 0.5 |
| Tego Airex 902w | 0.3 | 0.3 | 0.3 | 0.3 | 0.3 | 0.3 | 0.3 | 0.3 |
| Deuteron MK | 2 | 2 | 2 | 2 | 2 | 2 | 2 | 2 |
| BYK-346 | 0.3 | 0.3 | 0.3 | 0.3 | 0.3 | 0.3 | 0.3 | 0.3 |
| ACRYSOL RM-8W | 0.8 | 0.8 | 0.8 | 0.8 | 0.8 | 0.8 | 0.8 | 0.8 |
| Total | 100 | 100 | 100 | 100 | 100 | 100 | 100 | 100 |
| Solids, % | 34.0 | 34.0 | 34.0 | 33.03 | 33.02 | 34.0 | 34.0 | 33.04 |

As shown in Tables 3 and 4, the aqueous polymer compositions of Exs 1-3 provided coatings (Coatings 1-3) with improved water resistance and alcohol resistance without compromising early block resistance, as compared to coatings comprising ADH or no crosslinker (Comp Coatings A-E).

TABLE 3

Properties of wood coatings with acrylic binder ($T_g$: 18° C.)

| Coating | Comp Coating-A | Comp Coating-B | Comp Coating-C | Coating-1 | Coating-2 |
|---|---|---|---|---|---|
| Binder (aqueous polymer composition) | Comp Ex A | Comp Ex B | Comp Ex C | Ex 1 | Ex 2 |
| Pencil Hardness* | HB/HB | HB/2H | F/F | HB/HB | F/F |
| Flexibility, mm | >15 | >15 | >15 | >15 | >15 |
| Water Resistance | 3 | 4 | 4 | 5 | 5 |
| Alcohol Resistance | 2 | 3 | 3 | 4 | 4 |

TABLE 3-continued

Properties of wood coatings with acrylic binder ($T_g$: 18° C.)

| Coating | Comp Coating-A | Comp Coating-B | Comp Coating-C | Coating-1 | Coating-2 |
|---|---|---|---|---|---|
| Early Block resistance | B3 | B3 | A0 | B2 | B2 |

*pencil hardness: scratch trace/scratch damage

TABLE 4

Properties of wood coatings with acrylic binder ($T_g$: 37° C.)

| Coating | Comp Coating-D | Comp Coating-E | Coating-3 |
|---|---|---|---|
| Binder (aqueous polymer composition) | Comp Ex D | Comp Ex E | Ex 3 |
| Pencil Hardness* | 3B | H | F |
| Flexibility, mm | >15 | >15 | >15 |
| Water Resistance | 3 | 3 | 4 |
| Alcohol Resistance | 2 | 3 | 4 |
| Early Block resistance | C2 | A0 | B1 |

*pencil hardness: scratch trace/scratch damage

What is claimed is:

1. An aqueous polymer composition, comprising:
a polymer comprising structural units of a keto-containing (meth)acrylamide; and
a multiethylenically unsaturated aliphatic $C_5$-$C_{36}$ carboxylic acid monohydrazide.

2. The aqueous polymer composition of claim 1, wherein the multiethylenically unsaturated aliphatic $C_5$-$C_{36}$ carboxylic acid monohydrazide has the structure of formula (I) or (II),

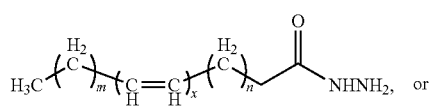

(I)

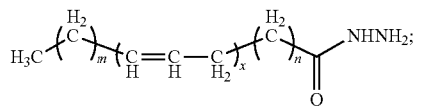

(II)

wherein each m is independently an integer from 0 to 24, each n is independently an integer from 0 to 24, and each x is independently an integer from 2 to 8.

3. The aqueous polymer composition of claim 1, wherein the multiethylenically unsaturated aliphatic $C_5$-$C_{36}$ carboxylic acid monohydrazide is a monohydrazide of an unsaturated carboxylic acid selected from the group consisting of eleostearic acid, α-linolenic acid, linoleic acid, and stearidonic acid.

4. The aqueous polymer composition of claim 1, wherein the multiethylenically unsaturated aliphatic $C_5$-$C_{36}$ carboxylic acid monohydrazide is present, based on the weight of the polymer, from 0.1% to 10% by weight.

5. The aqueous polymer composition of claim 1, wherein the polymer comprises, based on the weight of the polymer, from 0.1% to 20% by weight of structural units of the keto-containing (meth)acrylamide.

6. The aqueous polymer composition of claim 1, wherein the keto-containing (meth)acrylamide is selected from the group consisting of diacetone acrylamide, diacetone methacrylamide, and diacetone ethacrylamide.

7. The aqueous polymer composition of claim 1, wherein the polymer has a glass transition temperature of from −30° C. to 40° C.

8. The aqueous polymer composition of claim 1, wherein the polymer is a multistage polymer comprising:
a polymer (i) comprising: structural units of a multiethylenically unsaturated monomer, structural units of a monoethylenically unsaturated ionic monomer present in an amount of from 0 to 10% by weight of the polymer (i), and structural units of a monoethylenically unsaturated nonionic monomer; and
a polymer (ii) comprising: structural units of the keto-containing (meth)acrylamide, structural units of a monoethylenically unsaturated ionic monomer present in an amount of from 5% to 15% by weight of the polymer (ii), and structural units of a monoethylenically unsaturated nonionic monomer.

9. A method comprising
providing the aqueous polymer composition of claim 1, and
drying the aqueous polymer composition to form a crosslinked film.

10. An aqueous coating composition comprising the aqueous polymer composition of claim 1, and at least one component selected from the group consisting of a coalescent, a wetting agent, a thickener, a defoamer, a matting agent, a pigment, and an extender.

11. The aqueous coating composition of claim 10 having a pigment volume concentration of from 0 to 40%.

* * * * *